United States Patent [19]

Rathje, Jr.

[11] Patent Number: 5,179,886
[45] Date of Patent: Jan. 19, 1993

[54] RADIAL BEAM ARM SAW TABLE

[76] Inventor: Marvin E. Rathje, Jr., 1749 Navajo Rd., El Cajon, Calif. 92020

[21] Appl. No.: 700,444

[22] Filed: May 15, 1991

[51] Int. Cl.⁵ .............................................. B27B 5/20
[52] U.S. Cl. ................................... 83/471.3; 83/574; 83/489; 83/488; 83/486.1
[58] Field of Search ................... 83/574, 471.2, 471.3, 83/474, 477, 486, 486.1, 487, 488, 489; 144/286 R, 286 A, 287

[56] References Cited

U.S. PATENT DOCUMENTS

| | | | |
|---|---|---|---|
| 1,828,043 | 11/1931 | Hedgpeth | 83/574 |
| 2,584,863 | 2/1952 | Gesner | 83/486.1 |
| 2,652,862 | 9/1953 | Henry | 83/486.1 |
| 3,007,499 | 11/1961 | Dobslaw | 83/486.1 |
| 3,299,916 | 1/1967 | Packard et al. | 83/486.1 |
| 4,265,283 | 5/1981 | Nash et al. | 144/286 |
| 4,587,875 | 5/1986 | Deley | 83/574 |

*Primary Examiner*—Frank T. Yost
*Assistant Examiner*—Allan M. Schrock
*Attorney, Agent, or Firm*—Charles C. Logan, II

[57] ABSTRACT

The radial beam arm saw table has been designed to be combined with a conventional circular saw so that various types of cuts may be performed on sheets of wood when they are supported on its work platform. The saw table has a portable stand with structure for supporting a vertical post member having a support arm extending from its top end. A radial beam has one of its ends pivotally secured to the front end of the support arm about a vertical axis. A carriage is reciprocally mounted to travel axially along the length of the radial beam and it has a carriage platform pivotally secured thereto about a vertical axis. A bevel platform is pivotally secured to the carriage platform about a horizontal axis. A handle adaptor is pivotally secured to the bevel platform about a horizontal axis and it has a leg portion to which the handle of a circular saw may be detachably secured. The previously recited structure allows the circular saw to perform the following operations: cross cuts, extended cross cuts, rip cuts, rip bevel cuts, miter cuts, extended miter cuts, and compound angle cuts.

9 Claims, 3 Drawing Sheets

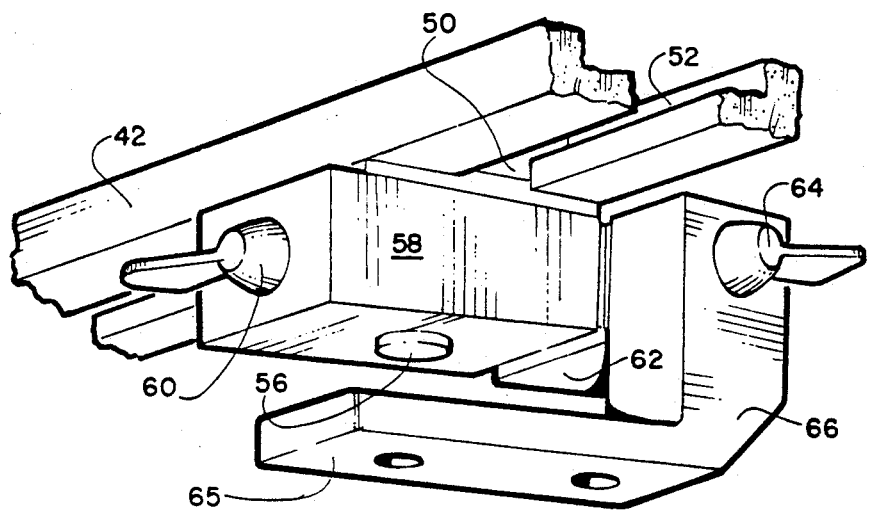
FIGURE 5
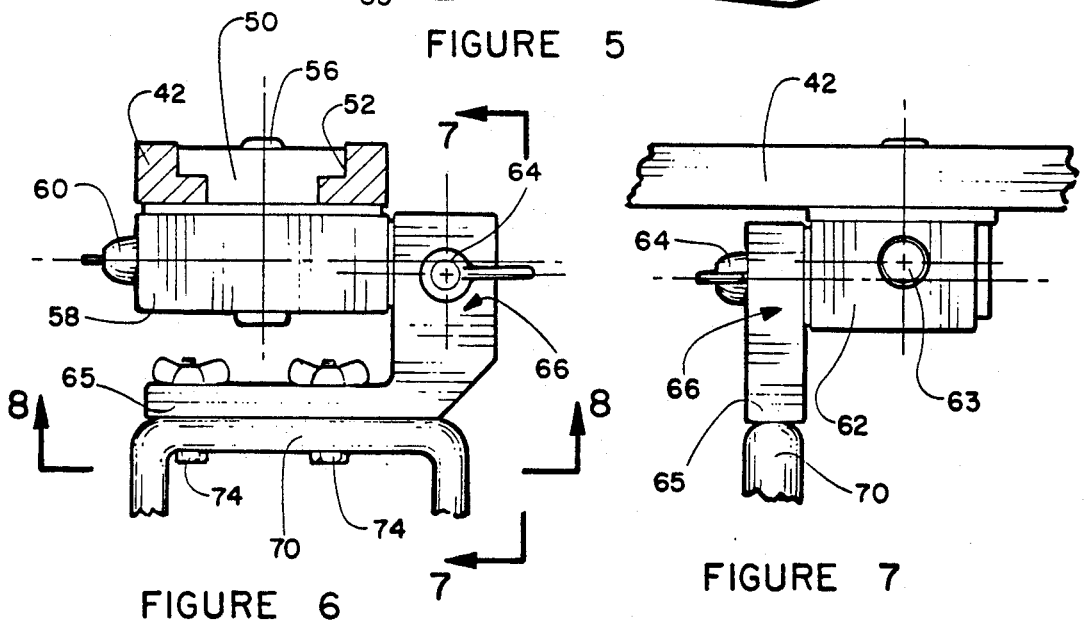
FIGURE 6
FIGURE 7
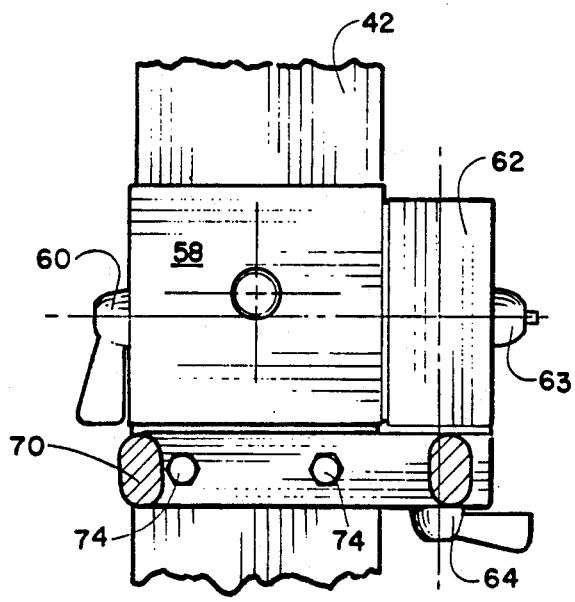
FIGURE 8

RADIAL BEAM ARM SAW TABLE

BACKGROUND OF THE INVENTION

The present invention relates to an elongated portable saw table and more specifically to one having unique structure attached thereto which will allow a conventional circular saw to perform functions normally done on a radial arm saw and a table saw.

Radial saws and table saws are both expensive and not considered to be very portable due to their weight. This presents a problem at construction sites that usually require the different sawing operations to be performed at a distance from where the cut wooden parts are assembled together. One of the basic pieces of equipment utilized by carpenters and framers in building structures is a circular saw and they are always required on a job site. There are no prior know devices which have been designed to adapt a conventional circular saw to a saw table that would allow it to perform the operations of a radial saw and a table saw.

It is an object of the invention to provide a novel radial beam arm saw table that is portable and which would utilize a water tank mounted thereon to provide the required rigidity for performing the necessary sawing operations.

It is another object of the invention to provide a novel radial beam arm saw table that has structure which will allow a conventional circular saw to be detachably secured to its structure thereby turning it into a radial arm saw.

It is a further object of the invention to provide a novel radial beam arm saw table which has been designed in such a manner that allows cross cuts and miter cuts to be performed on oversized sheets of wood whose width is greater than the width of the work platform of the saw table.

It is an additional object of the invention to provide a novel radial beam arm saw table that is economical to manufacture and market.

SUMMARY OF THE INVENTION

The inventor's novel radial beam arm saw table has been designed to be portable and have the capability of being sturdy when set up at its remote location. It has a portable stand with horizontal cross members connecting the respective top ends of its legs together to form a rigid four sided support frame. Spaced a predetermined distance below is a horizontal support platform upon which a water tank can be mounted. The water tank has a filling aperture on its top and a faucet adjacent its bottom end. It is therefore possible to transport the portable stand to its desired location while relatively light in weight and at that point fill the water tank with a sufficient amount of water to act as ballast and give ridigity to the stand.

A work platform is mounted on the top surface of the portable stand and it has sliding rail structure that allows it to be slid reciprocally from front to rear and back again.

A vertical post member has its bottom end supported so that the post member may be vertically adjusted. A support arm connected to the top of the vertical post member extends outwardly over the top of the work platform. A radial beam has one of its ends pivotally connected to the front end of the support arm about a vertical axis that allows the radial beam to be pivoted throughout a range of 360 degrees. It also has structure for locking the radial beam at any determined angle in its range of rotation. A carriage is mounted on the radial beam so that it can travel axially along the length of the radial beam. A carriage platform is pivotally secured to the bottom of the carriage so that it can rotate about a vertical axis and it has structure for locking it in any predetermined angle of rotation. A bevel platform is pivotally secured to the carraige platform about a horizontal axis and it has structure for locking it any predetermined angle. A handle adapter arm is pivotally secured to the bevel platform about a horizontal axis and it has structure for locking its leg portion in a horizontal position. The handle of a conventional circular saw can be detachably secured to the leg portion of the handle adapter.

When the circular saw has been attached in its required manner, it is capable of performing multiple types of cuts that are normally only performable with several types of different saws. It can perform a cross cut and also an extended cross cut due to the fact that the radial beam can be pivoted to a position in axial alignment with the support arm and thereby give it the capability of making cuts on a sheet of material approximately twice as wide as the work platform of the saw table. Also the circular saw can be rotated to an orientation that has its blade at a position which will allow full length rip cuts of material that are slid longitudinally along the work platform. The unique support structure for the circular saw also allows it to perform miter cuts and extended miter cuts along with compound angle cuts. It is further possible to raise the saw blade vertically for performing chop cuts.

DESCRIPTION OF THE DRAWINGS

FIG. 5 is an enlarged partial perspective view of the carriage platform, bevel platform and handle adapter;

FIG. 6 is an enlarged partial front elevation view of the carriage platform, bevel platform and handle adapter;

FIG. 7 is a side elevation view taken along lines 7—7 of FIG. 6; and

FIG. 8 is a bottom plan view taken along lines 8—8 of FIG. 6.

DESCRIPTION OF THE PREFERRED EMBODIMENT

Figure 1:
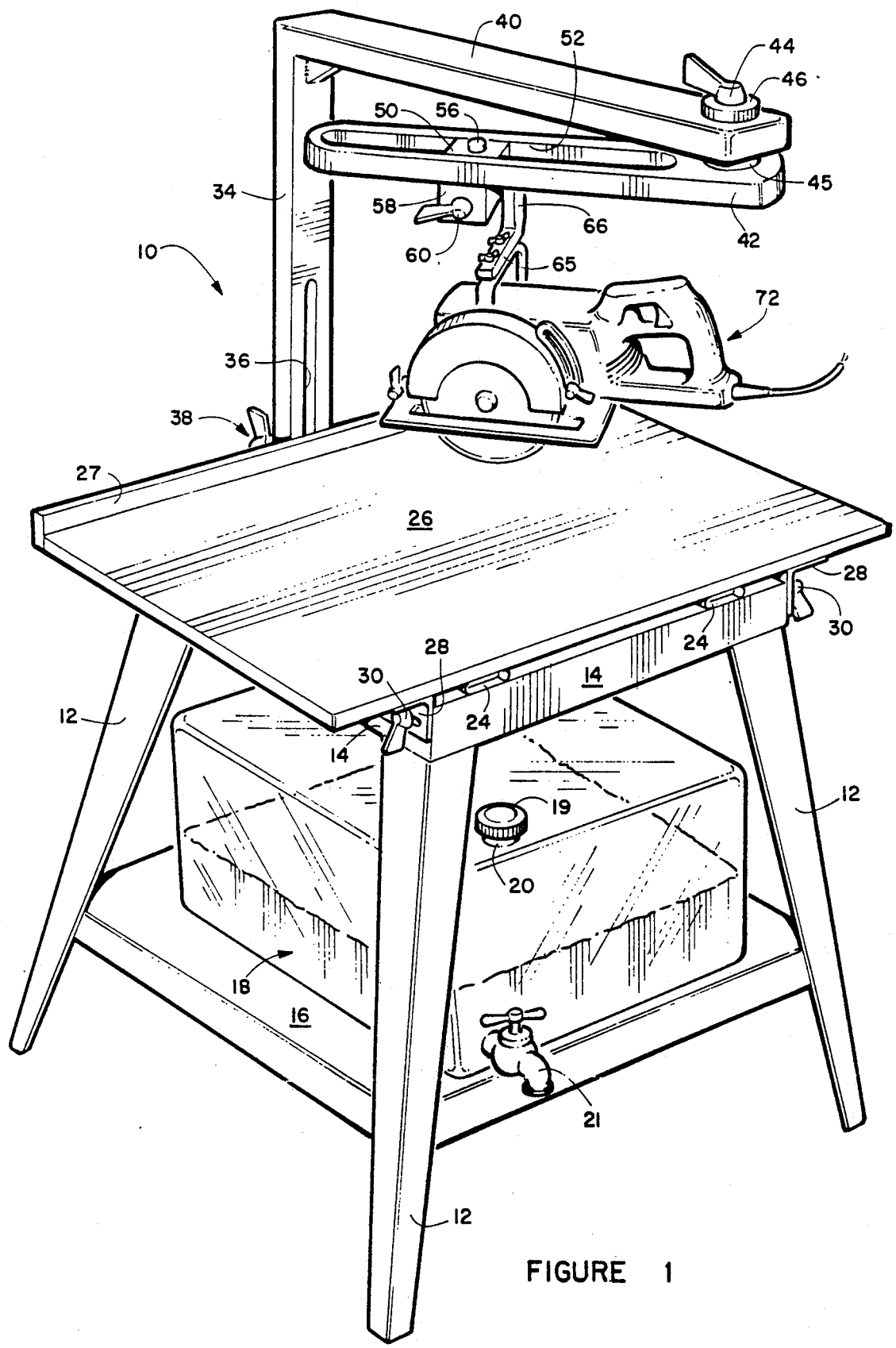
FIG. 1 is a front perspective view of the novel radial beam arm saw table with a worm-gear driven circular saw connected thereto.
Figure 2:
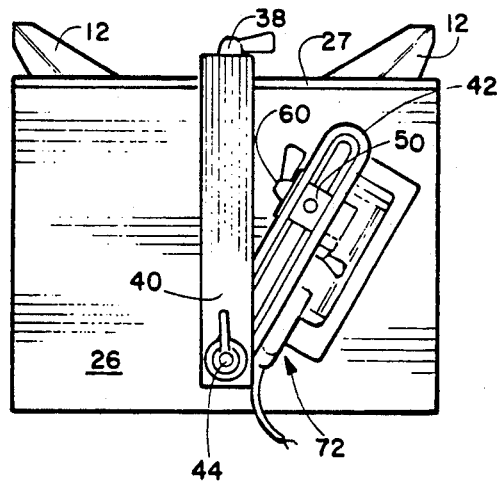
FIG. 2 is a top plan view of the radial beam arm saw table with its work platform in its normal position.
Figure 3:
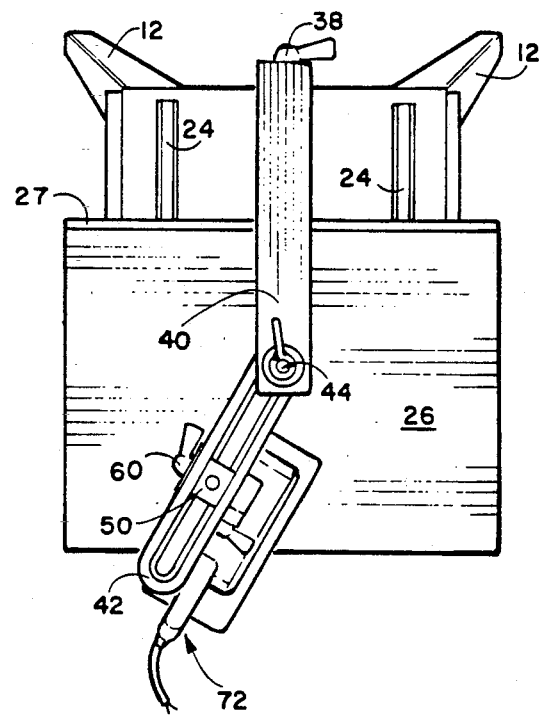
FIG. 3 is a top plan view of the radial beam arm saw table with the work platform in its extended position.
Figure 4:
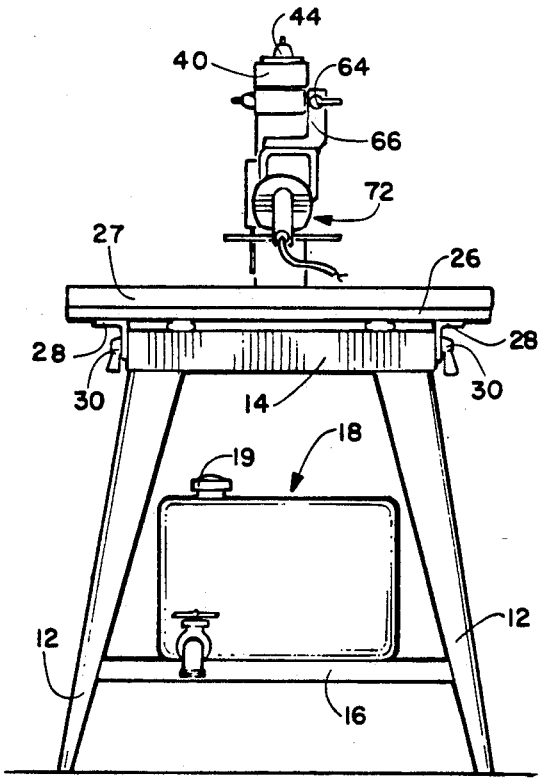
FIG. 4 is a front elevation view of the radial beam arm saw table.

The novel radial beam arm saw table will now be described by referring to FIGS. 1-8 of the drawings. The radial beam arm saw table is designated numeral 10. It has four legs 12 whose top ends are secured to cross members 14 to form a rigid four sided support frame. A support platform 16 is spaced a predetermined height below cross members 14. A water tank 18 having a cap 19, a neck 20 and a faucet 21 is filled with water and is supported on support platform 16.

A pair of laterally spaced sliding rails 24 have conventional structure for supporting work platform 26. Guide rails 28 are attached to the bottom surface of work platform 26 and they have slots into which locking bolts 30 pass to provide structure for locking work platform in any desired horizontal position.

A vertical post member 34 has a slot 36 adjacent its bottom end that cooperates with holder assembly 38 which has a locking bolt for securing it at any desired vertical height. A support arm 40 has its one end fixedly secured to the top end of vertical post 34. A radial beam 42 has its one end pivotally secured to the front end of support arm 40 about a vertical axis and it can be locked in any desired position by locking bolt 44 that extends down into boss member 45 that is rigidly secured to the top surface of radial beam 42. A direction angle disk 46 allows preset angles to be locked in position.

A carriage 50 is mounted in elongated track 52 of radial beam 42. A pin 56 pivotally secures carriage platform 58 to carriage 50 and allows it to be rotated throughout 360 degree range. Set screw locking mechanism 60 is used to lock the carriage platform 58 at its desired angle. Bevel platform 62 is pivotally secured to carriage platform 58 about a horizontal axis by locking bolt 63. A handle adapter 66 is pivotally secured to bevel platform 62 about a horizontal axis by locking bolt 64 and it has a leg portion 65 that extends downwardly under carriage platform 58. The handle 70 of a conventional worm-gear driven circular saw 72 is detachably secured to handle adapter arm 66 by bolts 74.

What is claimed is:

1. A radial beam arm saw table comprising:
   a portable stand with four upright legs, each of said legs having a top end and a bottom end, a plurality of horizontal cross members connect the respective top ends of said legs together to form a rigid four sided support frame;
   said portable stand having a front end and a rear end;
   a work platform mounted on the top of said portable stand;
   a vertical post member having a top end and a bottom end, a support arm having a longitudinal axis, said support arm having a front end and a rear end, said rear end being rigidly connected to the top end of said vertical post member and said front end extends horizontally out over said work platform;
   means for adjustably supporting the bottom end of said vertical post member so that it can be adjusted vertically with respect to said work platform;
   an elongated radial beam having a longitudinal axis, said radial beam having first and second ends, said first end being pivotally connected to the front end of said (radial) support arm about a vertical axis so that said radial beam may be pivoted beneath said (radial) support arm to a retracted position with their respective longitudinal axes being parallel aligned one above the other, said radial beam may also be pivoted 180 degrees to an extended position with their respective longitudinal axes being parallel aligned one above the other and the second end of said radial arm is located at its most remote distance from said vertical post member;
   a carriage and means for mounting it to said radial beam so that it may travel axially back and forth along the length of said radial beam;
   a carriage platform and means for pivotally connecting it to said carriage about a vertical axis so that it may be rotated 360 degrees;
   a bevel platform and means for pivotally connecting it to said carriage platform about a first horizontal axis that is perpendicular to the longitudinal axis of said elongated radial beam so that a saw blade can be raised vertically to perform chop cuts;
   a handle adaptor and means for pivotally connecting it to said bevel platform about a second horizontal axis that is perpendicular to said first horizontal axis so that bevel cuts can be performed, said handle adaptor having an elongated leg portion and means for detachably securing the handle of a conventional circular saw thereto, said second horizontal axis being laterally offset from the longitudinal axis of said radial beam and also parallel to the longitudinal axis of said radial beam and said elongated leg portion extends perpendicular to and underneath said radial beam.

2. A radial beam arm saw table as recited in claim 1 in combination with a worm-gear driven circular saw having a handle that is detachably secured to said handle adaptor.

3. A radial beam arm saw table as recited in claim 1 further comprising a support platform spaced downwardly a predetermined distance from the top of said portable stand and being secured to its legs.

4. A radial beam arm saw table as recited in claim 3 in combination with a water tank that is mounted on said support platform.

5. A radial beam arm saw table as recited in claim 1 further comprising means for sliding said work platform reciprocally from front to rear and back again.

6. A radial beam arm saw table as recited in claim 1 further comprising a rip fence mounted on said work platform.

7. A radial beam arm saw table as recited in claim 1 further comprising means for locking said radial beam at predetermined angles with respect to said support arm.

8. A radial beam arm saw table as recited in claim 1 further comprising means for locking said carriage platform at predetermined angles with respect to said radial beam.

9. A radial beam arm saw table as recited in claim 1 further comprising means for locking said bevel platform at predetermined angles with respect to said carriage platform.

* * * * *